United States Patent [19]
Hariharan

[11] Patent Number: 5,886,071
[45] Date of Patent: Mar. 23, 1999

[54] STABLE HIGH PERFORMANCE ONE PART ACRYLIC ADHESIVE SYSTEM

[75] Inventor: Deepak Hariharan, Franklin Park, N.J.

[73] Assignee: National Starch and Chemical Investment Holding Corporation, Wilmington, Del.

[21] Appl. No.: 918,795

[22] Filed: Aug. 26, 1997

[51] Int. Cl.[6] .................................. C09J 133/02
[52] U.S. Cl. ...................... 523/456; 524/357; 524/379; 524/390; 524/507; 525/119; 525/127
[58] Field of Search ................... 525/127, 119; 524/357, 379, 390, 507; 523/456

[56] References Cited

U.S. PATENT DOCUMENTS

| | | | |
|---|---|---|---|
| 2,453,520 | 11/1948 | Langkammerer | 260/429 |
| 2,468,916 | 5/1949 | Booge et al. | 260/429 |
| 2,820,181 | 1/1958 | Bowan et al. | 317/8 |
| 2,824,114 | 2/1958 | Bostwick | 260/429.3 |
| 2,838,418 | 6/1958 | Starkweather, Jr. | 117/65 |
| 3,222,419 | 12/1965 | Jubilee et al. | 260/836 |
| 3,576,755 | 4/1971 | Patella et al. | 252/300 |
| 3,873,640 | 3/1975 | Owston et al. | 260/859 R |
| 4,126,504 | 11/1978 | Wolinski et al. | 156/310 |
| 5,349,004 | 9/1994 | Kumar et al. | 524/461 |
| 5,360,462 | 11/1994 | Harmer et al. | 51/295 |
| B1 3,769,254 | 2/1985 | Anderson et al. | 524/398 |

FOREIGN PATENT DOCUMENTS

| | | | |
|---|---|---|---|
| 0 034 046 A1 | 8/1981 | European Pat. Off. | C09J 3/14 |
| 0 034 046 B2 | 8/1981 | European Pat. Off. | C09J 3/14 |
| 0 338 724 A2 | 10/1989 | European Pat. Off. | C09J 3/14 |
| 0 338 724 A3 | 10/1989 | European Pat. Off. | C09J 3/14 |
| 0 338 724 B1 | 10/1989 | European Pat. Off. | C09J 133/08 |
| 734133 | 7/1951 | United Kingdom . | |
| WO 93/12155 | 6/1993 | WIPO | C08G 18/67 |
| WO 93/13147 | 7/1993 | WIPO | C08F 220/18 |
| WO 93/13148 | 7/1993 | WIPO | C08F 220/18 |

OTHER PUBLICATIONS

Chemical Abstracts, vol. 105, No. 4, 28th Jul. 1986, p. 55, abstract No. 25405k, Columbus, OH; JP A 60 245 681 (Nitto Electric Industrial Co., Ltd) Dec. 5, 1985. "Abstract".

Chemical Abstracts, vol. 106, No. 24, 15th Jun. 1987, p. 53, abstract No. 197533n, Columbus, OH; JP A 61 261 383 (Nichiban Co., Ltd.) Nov. 19, 1986. "Abstract".

*Primary Examiner*—Patricia A. Short
*Attorney, Agent, or Firm*—Jane E. Gennaro; Lydia T. McNally

[57] ABSTRACT

An adhesive composition comprising: a) a metal-chelate cross-linker; b) a polyurethane or diepoxy cross-linker; c) an acrylate base polymer; d) a stabilizer for the metal-chelate cross-linker; and e) a non-reactive organic solvent is provided. The adhesive composition is stable and high-performance. The stable adhesive composition is stored as a one-part system.

4 Claims, No Drawings

5,886,071

STABLE HIGH PERFORMANCE ONE PART ACRYLIC ADHESIVE SYSTEM

BACKGROUND OF THE INVENTION

This invention relates to acrylic, pressure-sensitive adhesive compositions. Thus far, a need exists for acrylic, pressure-sensitive adhesive compositions which provide high adhesive performance at elevated temperatures, yet which may be stored as a one-part system.

High performance of acrylic adhesives at elevated temperature has previously been achieved by use of diacrylates for high-temperature cross-linking, but such adhesives must be stored and sold as a two-part system. EP 0 034 046 B2 (Date of Publication Jul. 19, 1989), for example, describes an adhesive composition particularly for high temperatures which comprises a first part comprising an acrylate ester monomer, a soluble polyacrylic rubber, an adhesion promoter, and a sulfonyl-chloride-free radical system; and a second part comprising an aldehyde-amine condensation product. The adhesive composition is, however, a two-part system.

SUMMARY OF THE INVENTION

This invention provides a stable, high performance acrylic adhesive which is a one-part system. The acrylate base polymer in the one-part adhesive composition is crosslinked with two cross-linkers, one which cures under normal drying operations and one which is activated at high temperature. Specifically, a polyurethane or a diepoxy cross-linker is incorporated into the adhesive composition at a sufficiently low level so as to remain unreactive with the acrylate base polymer while in solution, prior to dispensation and application. The amount of polyurethane or diepoxy cross-linker is, however, sufficient to cross-link the acrylate base polymer and provide adhesive stability at high temperatures. The second cross-linker in the adhesive composition is a metal-chelate cross-linker, which provides cross-linking of the acrylate base polymer after application and normal drying operations.

In sum, the subject invention pertains to an adhesive composition comprising: a) a metal-chelate cross-linker; b) a polyurethane or diepoxy cross-linker; c) an acrylate base polymer; d) a stabilizer for the metal-chelate cross-linker; and e) a non-reactive organic solvent. A composition according to this invention is a stable, high-performance adhesive composition.

DETAILED DESCRIPTION OF THE DRAWINGS

This invention provides an adhesive composition comprising: a) a metal-chelate cross-linker; b) a polyurethane or diepoxy cross-linker; c) an acrylate base polymer; d) a stabilizer for the metal-chelate cross-linker; and e) a non-reactive organic solvent. The subject composition is stable and high-performance. This stable composition is stored as a one-part system.

After the composition is dispensed, the solvent (e) evaporates under normal drying operations (for example, temperatures of from about 160 degrees Fahrenheit to about 260 degrees Fahrenheit), and the metal-chelate cross-linker (a) cross-links the acrylate base polymer (c). The polyurethane or diepoxy cross-linker (b) cross-links the acrylate base polymer (c) at high temperature (for example, from about 250 degrees Fahrenheit to about 500 degrees Fahrenheit).

The subject adhesive, after having been cured, has the capability to withstand temperatures from 300 degrees Fahrenheit to 500 degrees Fahrenheit at loads of from 1 psi to 4 psi for over 24 hours, while still having a peel strength greater than 4.5 lb/in.

For purposes of this invention, a "high performance" adhesive composition possesses high peel (greater than about 4 lb/in), and a shear hold either greater than about 24 hours at 1 psi and 450 degrees Fahrenheit or greater than about 24 hours at 4 psi and 350 degrees Fahrenheit.

A "stable" composition according to this invention has minimal increase in viscosity at room temperature and minimal increase in viscosity when kept in an oven at 120 degrees Fahrenheit for one week.

In preparing the compositions of this invention, the polyurethane or diepoxy (b) must be added with mixing, for example with a mixer. If the polyurethane or diepoxy is mixed into the composition slowly, as with a roller, gelling will result. Once mixed according to this invention (with mixing), the compositions will be stable for at least three months. Preferably, the polyurethane or diepoxy is added as a 1% solution in toluene.

The amount of polyurethane or diepoxy (b) used in the subject compositions is any amount which is sufficient to cause cross-linking at high temperatures, but which is low enough so that gelling (reaction with the acrylate base polymer) does not occur in solution. In other words, the amount is effective to provide a stable, high-performance adhesive composition. In one embodiment, the amount of polyurethane or diepoxy is greater than about 0.05% by weight (pbw) of the base polymer. The maximum amount of (b) is the amount which causes the composition to start to gel in solution. Gelling generally occurs at about 0.4% by weight of the base polymer. Preferably, the amount of polyurethane or diepoxy is from about 0.1% by weight of the base polymer to about 0.2% by weight of the base polymer.

Any polyurethane polymer having free, isocyanate groups may be used for the subject invention for (b), provided the polyurethane has an isocyanate functionality of at least 2 and complete isocyanate (NCO) termination. Also, the % NCO is in one embodiment greater than about 2, more preferably greater than about 10. The polyurethane may comprise aromatic linkages or it may be entirely aliphatic. Examples of polyurethanes which may be used for (b) for this invention include, but are not limited to, PAPI (polymethylene polyphenyl isocyanate), such as the PAPI polymers in the Rubinate series from ICI (e.g. 9009 (PAPI having a % NCO of 15.9 and a NCO functionality of 2) and 9041 (PAPI having a % NCO of 32 and a NCO functionality of 2.4). Another example of a useful polyurethane for the subject invention is polymeric HMDI (polymeric hexyl methylene diisocyanate), such as the polymeric HMDI X0671, which has a % NCO of 17 and a NCO functionality greater than 3. The polyurethane must be compatible with the base polymer (c); in other words, the polyurethane and base polymer must not phase separate in the composition.

A "diepoxy cross-linker" is any polymer which has at least two epoxy groups. Suitable diepoxy polymers for (b) may be branched or straight chain, aliphatic or aromatic. For example, any bisphenyl-a-based diepoxy may be used as a diepoxy for the subject invention, such as the bisphenyl-a-based diepoxy Epon 836 from Shell. Preferably, the diepoxy cross-linker has a molecular weight of from about 500 g/mol to about 5000 g/mol. Like the polyurethane, the diepoxy and the base polymer of the composition must not phase separate.

The metal chelate cross-linker (a) of the subject invention is any conventional metal chelate cross-linker known to those of ordinary skill in the art, for example a titanium metal chelate cross-linker, such as titanium acetyl acetonate, or an aluminum metal chelate cross-linker, such as aluminum acetyl acetonate (ACAC).

The amount of metal chelate cross-linker is any amount which is effective to provide a stable, high-performance adhesive composition. Preferably, the amount of metal chelate cross-linker is from about 0.05% by weight of the base polymer (c) to about 3% by weight of the base polymer, more preferably, from about 0.3% by weight of the base polymer to about 1% by weight of the base polymer.

The metal chelate cross-linker (a) is protected from reacting in solution (i.e. in the subject composition) by the stabilizer (d); once-the solvent (e) evaporates, the metal chelate cross-linker cross-links the base polymer. A non-limiting example of a suitable stabilizer for the metal chelate cross-linker is 2,4-pentanedione. In general, any dione may be used as a stabilizer Alcohols, such as ethanol or isopropanol, may be used as a stabilizer for (d) if (b) is a diepoxy and not a polyurethane.

The amount of stabilizer is an amount effective to stabilize the metal chelate cross-linker, and therefore depends- on the amount of metal chelate cross-linker in the adhesive composition. Typically, the ratio of stabilizer to metal chelate cross-linker is from about 1.05/1 to about 4/1.

The acrylate base polymer (c) for the subject invention may be any polymer, including any copolymer, which comprises acrylic units, provided the polymer has pendant carboxylic acid (COOH) groups. A pendant carboxylic acid group means a carboxylic acid group which is bound anywhere on the acrylate base polymer, for example in the middle of a chain of the base polymer or at the end of a chain of the base polymer. Preferably, the base polymer if from about 0.5% pendant COOH by weight to about 15% pendant COOH by weight, more preferably from about 3% pendant COOH by weight to about 10% pendant COOH by weight. The base polymer may be branched or linear. Preferably, the base polymer has a number average molecular weight of from about 30K to about 100K and a weight average molecular weight of from about 100K to about 500K. Examples of acrylate base polymers suitable for the subject invention include, but are not limited to, acrylics, vinyl acrylics, acrylamides, and methacrylates. Also suitable as the acrylate base polymer are n-vinyl pyrolidone (n-VP) based copolymers.

The amount of base polymer (c) in the compositions is relative to the amount of the cross-linkers (a) and (b). The combination of (a), (b), (c), and (d) is generally from about 10% to about 70% of the adhesive composition, and the solvent is thus generally from about 30% to about 90% of the adhesive composition.

The solvent (e) of the subject invention is any organic solvent which is non-reactive with (a)-(d) of the composition. Aliphatic solvents, for example, hexane or heptane, and aromatic solvents, for example, toluene or xylene, may be used in the adhesive compositions of this invention. Also, a combination of such organic compounds may be used as a solvent for the subject compositions. If (b) is a polyurethane cross-linker, the solvent must be a non-alcohol, non-acid solvent, such as ethyl acetate and/or toluene, in order to be non-reactive. As described above, the amount of solvent is generally from about 30% to about 90% of the composition.

The adhesive compositions of this invention are stored and distributed in a substantially liquid form, and they are stable in storage for at least three months.

In one type of application of the subject compositions, a composition of this invention is coated in liquid form onto a release liner, dried, transferred to a first article, and a second article applied. The adhesion of the two articles occurs with pressure.

The subject invention is also meant to encompass the adhesive composition described herein after it has cured, including compositions formed after cross-linking with the metal chelate after the solvent has evaporated, as well as after cross-linking at high temperature (above about 250 degrees Fahrenheit, by means of the polyurethane or diepoxy cross-linker). Also within the scope of the subject invention are articles which comprise the adhesive composition described herein, including articles which have been adhered by the adhesive composition described herein.

The subject adhesive composition is especially useful for adhering articles together which are exposed to high temperatures, such as articles within car engines or ovens (for example, film nameplates). The composition is useful for adhering articles made of materials such as, but not limited to, metal and films. The composition may also be used for transfer films and two-sided coated mounting tapes.

The adhesive compositions of this invention are self-crosslinking, have high peel and tack, and excellent coating ability. They deliver the benefits, such as convenience and economy, of a one-part system. They have excellent high-temperature performance, and tenacious adhesion to a variety of materials.

The following examples are merely provided to help illustrate the subject invention, and are not intended to, and should not in any way be construed to, limit the subject invention as defined in the claims of this application.

EXAMPLES

Acrylate polymers A, B, and C were used as base polymers in the Examples. Their monomer composition in weight percent for each monomer of the polymer is as follows:

| A | |
| --- | --- |
| 2-Ethylhexyl Acrylate | 70% |
| Vinyl Acetate | 21% |
| Acrylic Acid | 6% |
| B-Cyanoethyl Acrylate | 3% |
| B | |
| Methyl Acrylate | 27.5% |
| 2-Ethylhexyl Acrylate | 65.0% |
| Acrylic Acid | 7.5% |
| C | |
| Vinyl Acetate | 28.00% |
| 2-Ethylhexyl Acrylate | 67.00% |
| 2-Hydroxyethyl Acrylate | 5.00% |
| Glycidyl Methacrylate | 0.15% |

Example 1

The following compositions were prepared according to the subject invention; the amounts are in percent by weight (pbw):
Composition I
Base polymer B
0.1% PAPI
0.59% ACAC
2,4-pentanedione
ethyl acetate
toluene
Composition I gives greater than 24 hours of shear at 450 degrees Fahrenheit and 1 psi, and 150 hours of shear at room temperature and 10 psi and about 5.4 oz/in of peel strength. Composition I was stable for over one month at room temperature, with only a minimal increase in viscosity.
Composition II
Base polymer B
0.15% PAPI
0.59% ACAC
2,4-pentanedione
ethyl acetate
toluene Composition II gives greater than 24 hours of shear at 350 degrees Fahrenheit and 4 psi and has a peel strength of about 5 lb/in. Composition II gelled within a very short time.

Peel strength was determined according to the standard method for determining peel strength set forth by PSTC (the Pressure Sensitive Tape Counsel). A tape coated with adhesive composition is bound to a stainless steel strip, and the stainless steel strip is pulled away from the tape at a constant rate of 12 inches per minute at an angle of 180 degrees. The force (in lb/(inch of tape)) required to remove the stainless steel strip at 180 degrees from the tape is measured, and this value is the peel strength.

Shear hold was also determined according to the standard PSTC method. For example, a 10 psi shear hold is the amount of time required for a 10 pound dead weight suspended from a 1 square inch polyester substrate adhered with adhesive composition to a stainless steel panel to fall from the panel.

Example 2

The following materials were used in Example 2:
Base polymer A (see above);
Base polymer B (see above);
PAPI (% NCO=31.4, NCO functionality=2.7);
9009 (% NCO=15.5, NCO functionality=2.0);
9041 (% NCO=32, NCO functionality=2.4);
30-6803, polymeric toluene diisocyanate from FLA (% NCO=13.2, NCO functionality=2.0);
X0671, polymeric HMDI (% NCO=17, NCO functionality >3);
CX-100, polyfunctional aziridine, a blocked isocyanate;
IPDI, isophorone diisocyanate, a monomer isocyanate;
CDI, Carbodiimide;
ACAC, aluminum acetyl acetonate;
TYGBA, Tyzor GBA, titanium acetyl acetonate;
Compositions 1–34 were prepared as set forth below in Table I.

The stabilizer in each of compositions 1–34 was 1,4-pentanedione and was present in an amount of 1.05 times the amount of metal chelate cross-linker. Each of compositions 1–34 was about 40% solvent. The percentages in parentheses in Table I are the percent of that substance by weight of the dry base polymer.

TABLE I

| Composition | Base Polymer | Metal Chelate Cross-Linker | Cross-Linker 2 |
|---|---|---|---|
| 1 | A | ACAC (.26%) | CDI (3%) |
| 2 | A | ACAC (.26%) | CX100 (3%) |
| 3 | A | ACAC (.26%) | TYGBA (1%) |
| 4 | B | | CDI (3%) |
| 5 | B | | CX100 (3%) |
| 6 | B | | TYGBA (1%) |

TABLE I-continued

| Composition | Base Polymer | Metal Chelate Cross-Linker | Cross-Linker 2 |
|---|---|---|---|
| 7 | A | ACAC (.26%) | CX100 (0.5%) |
| 8 | B | | CX100 (1%) |
| 9 | A | ACAC (.26%) | IPDI (.3%) |
| 10 | B | | IPDI (.3%) |
| 11 | A | ACAC (.26%) | 306803 (.15%) |
| 12 | A | ACAC (.26%) | PAPI (0.1%) |
| 13 | A | ACAC (.26%) | PAPI (0.1%) |
| 14 | A | ACAC (.61%) | PAPI (0.1%) |
| 15 | A | TYGBA (0.4%) | PAPI (0.1%) |
| 16 | A | ACAC (.26%) | PAPI (0.1%) |
| 17 | A | ACAC (.26%) | 9009 (0.5%) |
| 18 | A | ACAC (.26%) | 9041 (0.5%) |
| 19 | A | ACAC (.26%) | 9009 (1%) |
| 20 | A | ACAC (.26%) | PAPI (.12%) |
| 21 | A | ACAC (.26%) | 9009 (0.1%) |
| 22 | A | ACAC (.26%) | 9041 (0.1%) |
| 23 | A | ACAC (.61%) | PAPI (0.1%) |
| 24 | A | ACAC (.61%) | PAPI (.12%) |
| 25 | A | ACAC (.76%) | PAPI (.15%) |
| 26 | C | | PAPI (0.1%) |
| 27 | C | | PAPI (.15%) |
| 28 | A | ACAC (.26%) | PAPI (0.5%) |
| 29 | A | ACAC (.26%) | PAPI (0.2%) |
| 30 | A | ACAC (.26%) | PAPI (0.3%) |
| 31 | A | ACAC (.26%) | PAPI (0.4%) |
| 32 | A | TYGBA (0.4%) | |
| 33 | A | ACAC (.26%) | XO671 (0.1%) |
| 34 | B | ACAC (.26%) | PAPI (0.1%) |

The stability (whether or not the composition gelled) for each of compositions 1–34 was observed. Then, the adhesives which proved stable were coated onto a release liner at 1 mil dry thickness, dried in an oven of about 250° F., and transferred to a 2 mil polyester film. The peel strength and shear hold for those compositions were determined as described above. The results are in Table II.

TABLE II

| Composition | Stability | Peel | Shear Hold at High Temp. | 10 psi at R.T. (hours) |
|---|---|---|---|---|
| 1 | gel | | | |
| 2 | gel | | | |
| 3 | gel | | | |
| 4 | gel | | | |
| 5 | gel | | | |
| 6 | gel | | | |
| 7 | gel | | | |
| 8 | gels in 50 min. | | | |
| 9 | gel | | | |
| 10 | gel | | | |
| 11 | stable | | 1 psi, start temp. = 270° F., held 20 min. to 360° F. | |
| 12 | stable | | 1 psi, start temp. = 270° F. held 18 h to 420° F. (expt. stopped) | |
| 13 | stable | | 1 psi 450° F.>24 | 10.7 |
| 14 | stable | 75.1 | | >107 |
| 15 | stable | 77.3 | | 110 |
| 16 | stable | | | |
| 17 | semi-gel | | | 8.2 |
| 18 | semi-gel | | | |
| 19 | gel | | | |
| 20 | stable | | | 5.1 |
| 21 | stable | | 4 psi, 350° F., 5 min.; 1 psi, 450° F.>24 hrs. | 4.1 |
| 22 | stable | | 4 psi, 350° F., | 6.5 |

TABLE II-continued

| Composition | Stability | Peel | Shear Hold at High Temp. | 10 psi at R.T. (hours) |
|---|---|---|---|---|
| 23 | stable | | 5 min.; 1 psi, 450° F. >24 hrs. 4 psi, 350° F., 6.5 min. | >300 |
| 24 | stable | | | >300 |
| 25 | stable | | 4 psi, 350° F., >40 hrs. | >300 |
| 26 | gel | | | |
| 27 | gel | | | |
| 28 | gel | | | |
| 29 | stable | | | |
| 30 | gel | | | |
| 31 | gel | | | |
| 32 | gel | | | |
| 33 | stable | | | |
| 34 | stable | | 1 psi, 450° F., >24 hrs. | |

What is claimed is:

1. An adhesive composition comprising:
   a. a metal-chelate cross-linker in an amount effective to provide a stable, high performance adhesive composition;
   b. a polyurethane or diepoxy cross-linker in an amount effective to cause cross-linking at high temperatures without producing gelling in solution and wherein the polyurethane has isocyanate functionality greater than or equal to 2;
   c. a polymer comprising acrylic units and having pendant carboxylic acid groups;
   d. a dione or alcohol stabilizer for the metal-chelate cross-linker in an amount effective to stabilize the metal-chelate cross-linker, provided that if component (b) is diepoxy then the stabilizer is an alcohol; and
   e. a non-reactive organic solvent.

2. An adhesive composition according to claim 1, wherein (b) is a polyurethane, and the polyurethane has complete isocyanate termination.

3. An adhesive composition according to claim 1, wherein the metal chelate cross-linker of (a) is from about 0.05% by weight of the acrylate base polymer of (c) to about 3% by weight of the acrylate base polymer of (c).

4. An adhesive composition according to claim 1, wherein the polyurethane or diepoxy cross-linker of (b) is greater than about 0.05% by weight of the acrylate base polymer of (c).

* * * * *